United States Patent [19]

Schultz et al.

[11] Patent Number: 5,265,004

[45] Date of Patent: Nov. 23, 1993

[54] SEQUENCE CONTROLLER WITH COMBINATORIAL BOOLEAN LOGIC

[75] Inventors: Michael E. Schultz, Euclid; James A. Stermole, Cleveland; Steven M. Zink, Hudson; Arthur P. Pietrzyk, Thomson, all of Ohio

[73] Assignee: Allen-Bradley Company, Inc., Milwaukee, Wis.

[21] Appl. No.: 776,917

[22] Filed: Oct. 15, 1991

[51] Int. Cl.⁵ .............................................. G05B 11/01
[52] U.S. Cl. .................................... 364/140; 364/141
[58] Field of Search ................. 364/140, 147, 141, 146

[56] References Cited

U.S. PATENT DOCUMENTS

| | | | |
|---|---|---|---|
| 3,974,484 | 8/1976 | Struger et al. | 340/172.5 |
| 4,302,820 | 11/1981 | Struger et al. | 364/900 |
| 4,442,504 | 4/1984 | Dummermuth et al. | 364/900 |
| 4,742,443 | 5/1988 | Rohn et al. | 364/136 |
| 4,858,101 | 8/1989 | Stewart et al. | 364/131 |
| 4,858,102 | 8/1989 | Lovrenich | 364/136 |
| 4,876,664 | 10/1989 | Bittorf et al. | 364/900 |
| 4,937,777 | 6/1990 | Flood et al. | 364/900 |
| 5,042,002 | 8/1991 | Zink et al. | 364/900 |
| 5,072,356 | 12/1991 | Watt et al. | 364/140 |
| 5,097,407 | 3/1992 | Sato | 364/140 |
| 5,128,857 | 7/1992 | Okada et al. | 364/140 |

OTHER PUBLICATIONS

Book entitled *Zone Logic*, by Ralph Roberts, 1989.
"Distributed Machine Control Uses Zoned Logic, Isolated Controllers, Fiber Optics", *Control Engineering Magzine*, Aug. 1987.
Master's thesis from Massachusetts Institute of Technology entitled "A CRT-Based State Transition Language for Industrial Sequential Control", Jun. 1981, pp. 105-112.

*Primary Examiner*—Jerry Smith
*Assistant Examiner*—Jim Trammell
*Attorney, Agent, or Firm*—Quarles & Brady

[57] ABSTRACT

A programmable controller for sensing the status of input devices and controlling the state of operating devices in accordance with a stored ladder logic control program includes a state machine instruction. A memory is provided for storing data regarding each state of an apparatus being controlled. This data defines the status of apparatus operating devices for each state, and the legitimate transitions from that state to other selected states, along with a Boolean logic expression of selected input conditions which determines when a state transition should occur. A processor responds to the state machine instruction by examining the truth of the Boolean logic expressions for the present state of the apparatus to detect if a state transition should occur. Upon such a detection controller advances to the state associated with the detected true expression. State transitions also can be defined as occurring upon a specified change in the status of a single input. Other mechanisms are provided to detect illegitimate states of the apparatus and take appropriate action.

7 Claims, 9 Drawing Sheets

SEQUENCE CONTROLLER WITH COMBINATORIAL BOOLEAN LOGIC

The present invention relates to electronic controllers for operating industrial equipment, and more specifically to programmable controllers and sequence controllers as generally disclosed in U.S. Pat. Nos. 3,974,484 and 4,742,443.

BACKGROUND OF THE INVENTION

Programmable controllers are well known devices for operating industrial equipment such as assembly lines and machine tools, in accordance with a stored program. In these controllers, a control program is stored in a memory and includes instructions which are read out in rapid sequence and executed to examine the condition of selected sensing devices on the controlled equipment, and to energize or de-energize selected operating devices on the controlled equipment contingent upon the status of one or more of the examined sensing devices. Other instructions are provided not only to manipulate single-bit input and output data representing the state of the sensing and operating devices, but also to perform arithmetic operations, timing and counting functions, and more complex processing operations.

In carrying out its functions, programmable controller processor is expected to execute well-known programmable controller type instructions. Such instructions have become quite standardized in the industry and they are directly associated with the elements of a ladder logic diagram which is easily understood by control engineers. Program panels such as those described in U.S. Pat. Nos. 3,798,612; 3,813,649 and 4,070,702 have been developed to assist the user in developing and editing ladder logic control programs comprised of such programmable controller instructions.

Another type of machine controller is a sequencer, such as a mechanical rotating drum sequencer of the type which controls washing machines. A series of projecting tabs on a drum are aligned to make or break electrical switch contacts as the drum rotates in a predefined direction. Thus, as the drum rotates, stepping through a set sequence, various combinations of outputs may be energized or de-energized. The conventional sequencer has been implemented as a programmable electronic device, such as the one described in U.S. Pat. No. 3,974,484. The traditional sequencer has the advantage that in the event of an error condition, the state of the equipment that prompted the error condition are easily determined. One drawback of this type of controller is that the process being controlled must always advance from one step to the same subsequent step. In many control processes, however, it is necessary to advance from a step to one of several subsequent steps depending upon the state of the control process.

To meet this need, a directed sequencer was developed, as described in U.S. Pat. No. 5,042,002. This device enabled a transition to occur from each state to one of a plurality of possible states defined by the user. Each transition was triggered by a single input data bit making a predetermined logic level transition. This bit represented the status of a sensor that responded to a parameter of the process or machine being controlled. Although many processes can be easily broken down into individual steps from which a transition will occur when a single input sensor bit changes, it often is difficult to divide complex processes to the degree where a single sensed parameter triggers a step transition. In the latter case, it is desirable to define the process in higher level terms in which a series of input bits, or parameter states, define transitions between steps.

SUMMARY OF THE INVENTION

A programmable controller has a processor which repeatedly executes instructions of a stored control program. The execution of the control program examines the status of input devices connected to the controller and operates output devices also connected to the controller in accordance with the condition of selected input devices. The programmable controller includes a memory which has a first section for storing data relating to a series of machine control steps. The data for each step include the statuses for the output devices; a designation of one or more transitions which can occur from that step to other steps in the series; and for each such transition, a Boolean logic expression of the status of a plurality of input devices selected by the user in which the truth of the expression indicates that the specific step transition should take place. The memory also includes a storage location for an indication of at which one of the series of steps the control program is currently functioning.

The programmable controller includes a means for setting the states of the output devices to correspond to the states stored for the currently active machine control step. A detection means also is provided for evaluating the truth of each Boolean logic expression defined for the current step. An additional means is responsive to the detection, means finding a true expression by storing an indication of the next sequence step in the storage location.

An object of the present invention is to provide a sequencer in which a transition can occur from a given step to a subsequent step in response to a series of inputs having the status specified by a Boolean logic expression defined by the user.

Another object of the present invention is to provide a sequence type control function which is executable from a conventional ladder type control program.

Yet another object is to provide a mechanism for forcing a defined transition to occur, if the sequencer remains at a given step for more than a predetermined amount of time.

DETAILED DESCRIPTION OF THE INVENTION

The present inventive concept is the integration of an improved sequence control function into a programmable controller system. The sequence control function is provided in the preferred embodiment by an additional instruction for use with standard ladder diagram type control programs for the programmable controller. In order to understand the operation of the sequence control function, an understanding of the hardware for a typical programmable controller will be beneficial.

Figure 1:
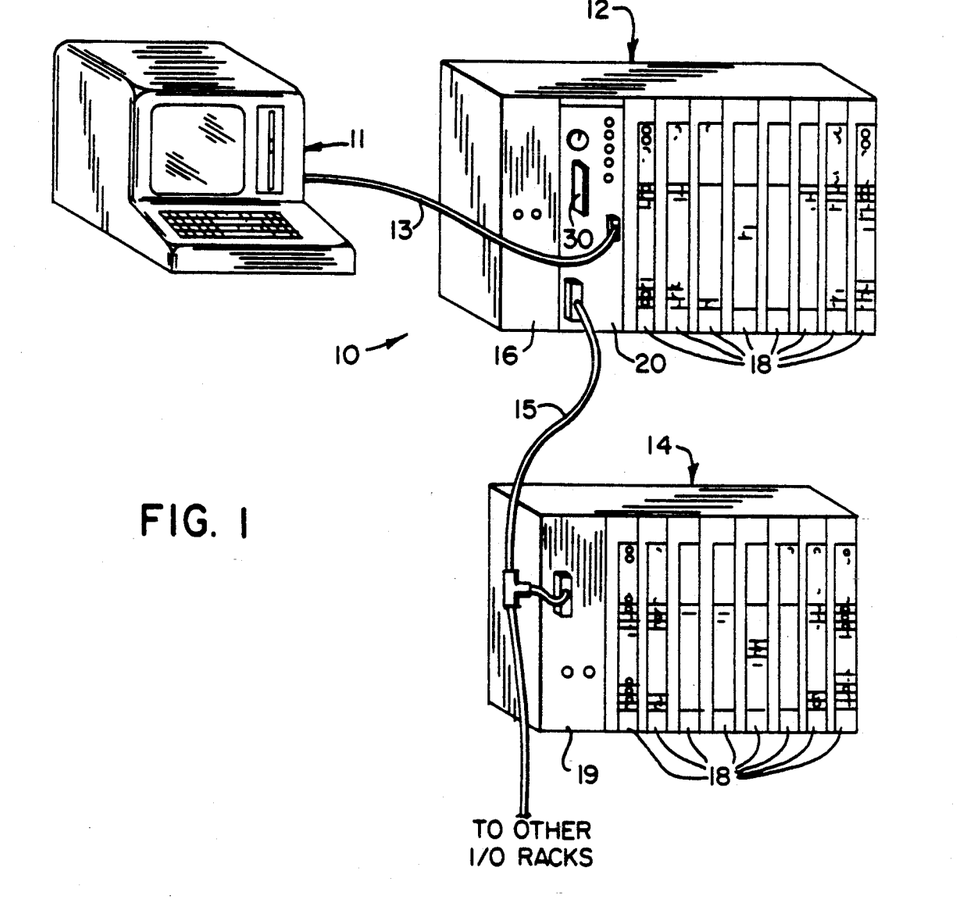
FIG. 1 is a perspective view of a programmable controller which employs the present invention.

Referring to FIG. 1, a programmable controller system 10 comprises a primary equipment rack 12 and one or more remote input/output (I/O) racks 14 connected by a serial I/O communication network 15. A programming terminal 11 enables the user to program the controller 10 and monitor its operation.

The primary rack 12 houses a power supply 16, processor module 20 and a plurality of input/output interface modules 18. The processor module 20 executes a user-defined control program that responds to signals from sensing devices on the controlled equipment by issuing signals to actuating devices on the same equipment. The sensing and actuating signals are coupled to the rack 12 through the input/output interface modules 18. The various modules 18 and 20 within the primary rack 12 are electrically interconnected by conductors on a backplane of the rack enabling data and control signals to be exchanged among the modules.

The processor module 20 receives programming instructions via the terminal 11 that is connected by cable 13 to a serial port connector on the front panel of the module. The serial I/O network 15 is coupled to a second connector on the front panel of the processor module 20 and to an adaptor module 19 in the remote I/O rack 14, enabling the processor module to exchange data with another group of I/O modules within the remote I/O rack. Alternatively, a local area network can be coupled to one of the connectors on the front panel of the processor module 20 enabling communication with a host computer and other programmable controllers coupled to that network.

PROCESSOR MODULE

Figure 2:
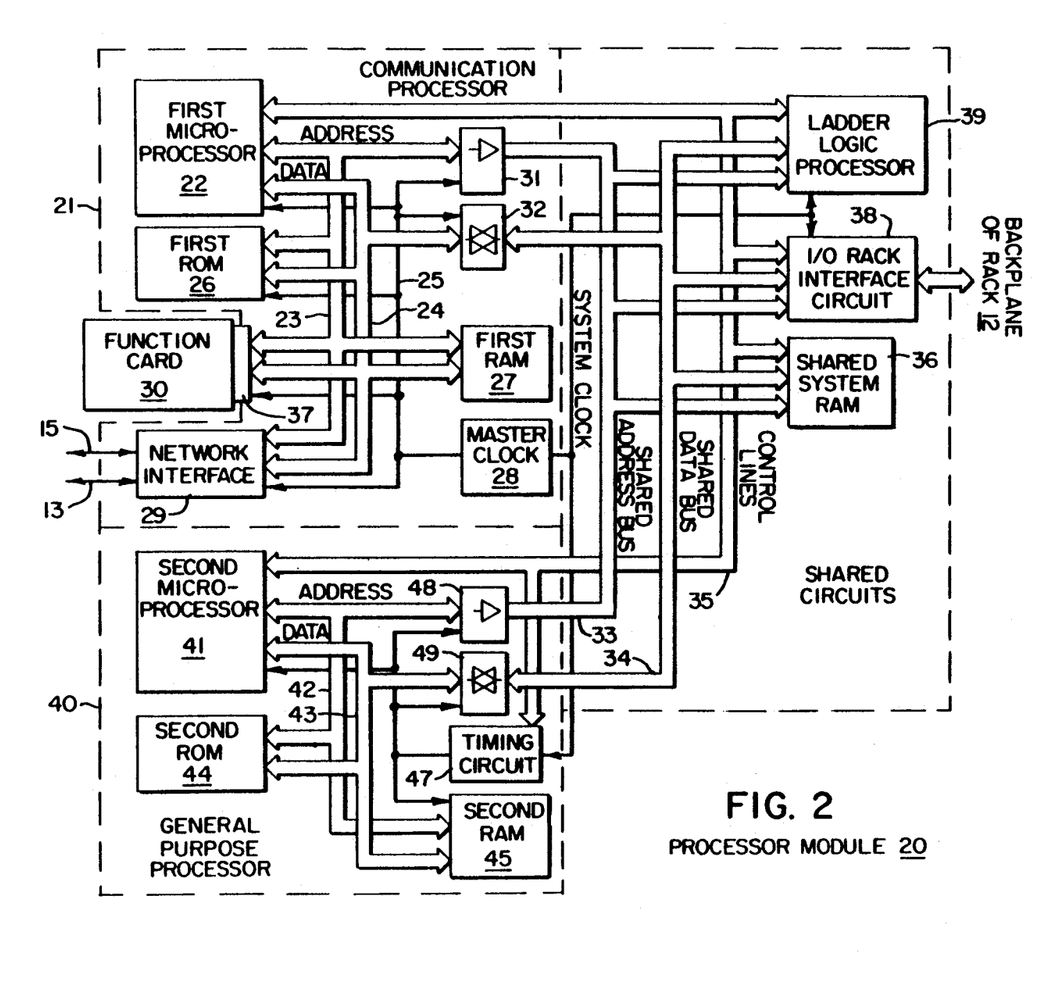
FIG. 2 is an electrical schematic diagram of a processor module in the programmable controller of FIG. 1.

Referring to FIG. 2, the processor module 20 includes a general purpose processor section 40 for user control program execution and a communication processor section 21 which handles the exchange of data over cable 13 and the serial I/O network 15. The processor module 20 also has a set of shared buses 33-35 which connect these sections 21 and 40 with other data processing and storage components.

The communication processor section 21 is formed around a local address bus 23 and a local data bus 24. Coupled to these buses is a first microprocessor 22 which executes a program stored in a first read only memory (ROM) 26 and utilizes a first random access memory (RAM) 27 for data storage. A master clock circuit 28 provides a system clock signal to the other components of the processor module 20 as well as providing specific timing signals via control lines 25 to the components of the communication processor section 21.

The first microprocessor 22 is responsible for controlling communication with the programming terminal 11 and the serial I/O network 15. A communication link interface circuit 29 couples the local address and data buses 23 and 24 to the terminal cable 13 and to the remote I/O network 15. The communication link interface circuit 29 translates the data between a parallel format used within the processor module and a serial format used to exchange data over terminal cable 13 and serial I/O network 15.

The local buses 23-25 of the communication processor section 21 also are coupled to a connector 37. A removable, small printed circuit board, referred to herein as function card 30 extends through a opening in the front panel of the processor module 20 (as shown in FIG. 1) and has a mating connector that engages the bus connector 37. An elementary function card contains nonvolatile memory in which machine control programs are archived. An intelligent type of function card contains a microprocessor dedicated to performing a special data processing task such as handling communication over a wide area network connected to the card.

The communication processor section 21 is coupled to other processor module components through a set of tri-state address gates 31 and a set of bidirectional tri-state data gates 32. Specifically, the set of gates 31 couples the local address bus 23 to the module's shared address bus 33, and the set of data gates 32 connect the local data bus 24 to a shared data bus 34. A set of control lines 35 extends between processor module components and hereinafter is referred to as a control bus.

This connection of buses allows the first microprocessor 22 to write and read data to and from a shared system RAM 36 connected to the shared address and data buses 33 and 34. This memory 36 holds a conventional set of input/output data tables storing the status of sensing and operating devices on the machine controlled by the programmable controller. The user-defined control program is stored in another section of the shared system RAM 36. A further section of the shared system RAM 36 is used to contain system, processor module, and microprocessor level configuration data. The data structures for the shared system RAM 36 will be described hereinafter.

Referring still to FIG. 2, an I/O rack interface circuit 38 is connected to the shared address and data buses 33 and 34 and the backplane of primary rack 12. This interface circuit 38 periodically scans the I/O modules 18 in the primary rack to gather input data from the sensors and send output data to the actuating devices. The scanning is accomplished in a manner similar to that employed by previous processor modules by sequentially sending control signals to each I/O module 18. These control signals cause input type modules to send sensor data over the backplane and cause output type modules to store data sent by the processor module 20. The data exchanged with the I/O modules 18 in the primary rack 12 are stored in the I/O data tables of the shared system RAM 36. Data is exchanged with the remote I/O racks 14 in a similar manner by the communication processor section 21.

A ladder logic processor 39 also is coupled to the shared address and data buses 33 and 34. The vast majority of ladder control program instructions operate on a single bit or word of data. The ladder logic processor 39 has been designed to execute the subset of ladder diagram instructions which perform these basic control operations. This not only provides efficient execution of these instructions, it also frees the microprocessors in the module 20 to carry out other functions simultaneously with the control program execution.

Certain functions, such as immediate I/O module access, data block transfers to the I/O modules 18, and complex mathematical and logical operations cannot be performed by the ladder logic processor 39. These complex control program functions, including the subject sequence control function, are executed in the general purpose processor section 40. This section 40 of the processor module 20 contains a second microprocessor 41 connected to its own isolated set of local address and data buses 42 and 43. This pair of local buses 42 and 43 couples the second microprocessor 41 to a second ROM 44 and a second random access memory 45. The ROM 44 stores the firmware which is executed by the second microprocessor 41 to carry out the complex ladder logic operations and the sequence control function as will be described.

A timing circuit 47 receives the system clock signal and derives therefrom the necessary timing and control signals for the second microprocessor 41 and memories 44 and 45. A pair of tri-state transmission gates 48 and 49 isolate the local address and data buses 42 and 43 of the general purpose processor section 40 from the shared address and data buses 33 and 34. When these gates 48 and 49 are enabled in response to a command from the second microprocessor 41, the set of local buses 42 and 43 are electrically connected to shared buses 33 and 34. This enabling occurs only when the second microprocessor 41 has been granted access to the shared buses 33 and 34 by an arbitration circuit in the ladder logic processor 39.

DATA STRUCTURES

Figure 3:
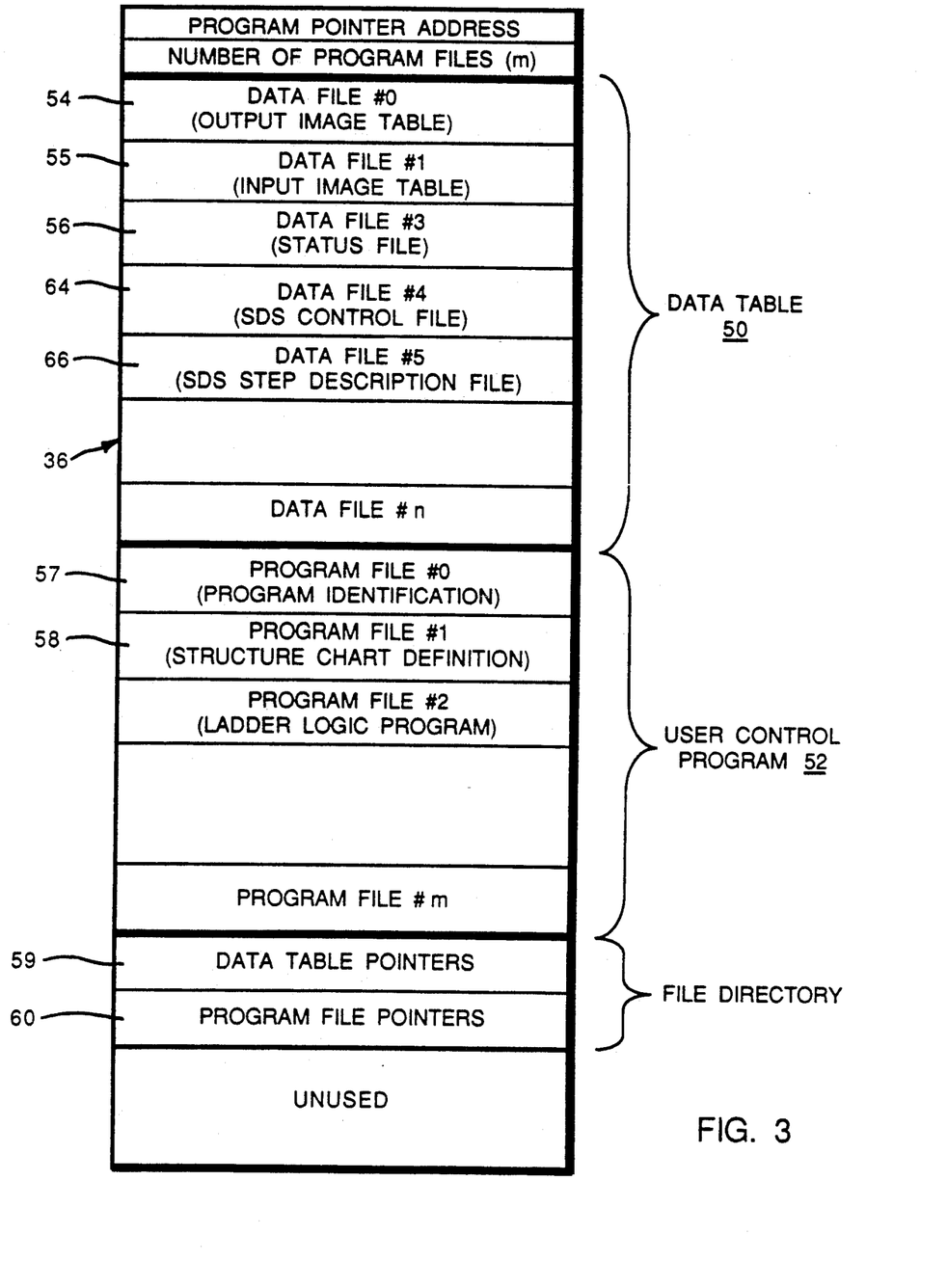
FIG. 3 is a memory map of a random access memory in the processor module.

Referring particularly to FIG. 3, the shared system RAM 36 stores a number of data structures which are employed by the ladder logic processor 39 and the second microprocessor 41 to carry out their functions. These structures include the system data table 50 and the user control program 52.

The system data table 50 has a series of data files, each of which contains data related to a specific function in the operation of the programmable controller. Data file #0, for example, is an integer type file which functions as an output image table 54, and data file #1 is an integer type file which functions as an input image table 55. As in previous programmable controllers, the input image table 54 and the output image table 55 hold data which reflect the status of the I/O devices connected to the I/O modules 18 in the racks 12 and 14. In the simplest form, each bit stored in the input image table 55 represents the state of a switch type input device and each bit of the output image table controls the on/off state of an output device. Data file #3 also is an integer type file which is dedicated to function as a status file 56. The status file 56 contains data defining the current status of the programmable controller system, such as arithmetic flags, timers, counters, real time clock and calendar data. As will be described, the status file data can be examined by a control program as indicating different operational parameters of the equipment being controlled. A set of Data Table Pointers 59 is stored in a file directory section of the shared system RAM 36 and is used to access the data files.

The shared system RAM 36 also stores a series of files which constitute the user defined control program 52, as illustrated in FIG. 3. Program files #0 and #1 are dedicated to specific functions, but the remaining program files are variable in both type and size. Program file #0 in section 57 is for program identification and another section 58 is a program file #1 defining a sequential function chart. Each program file in the user control program 52 is identified by a program file pointer 60 which is stored in the file directory section of the shared system RAM 36. Each such pointer indicates the program file type, absolute memory starting address and length of the program. Each pointer also indicates if the file is write protected and it provides a checksum of the program file which is employed as a diagnostic tool.

There are three types of program files: ladder; sequential function chart; and machine language. The term "ladder" is derived from the ladder logic diagram format which is used to display the program on the programming terminal 11 and are a common program used in previous programmable controllers. Sequential function chart programs are executed by an interpreter routine similar to the one described in U.S. Pat. No. 4,742,443. Machine language program files contain instructions which are executable directly by the second microprocessor 41. These programs are employed to implement the dual language feature as described in U.S. Pat. No. 4,302,820.

The present system has enhanced the standard set of ladder diagram logic operations by adding a smart directed sequencer (SDS) function as one of the machine language programs. In a conventional programmable sequencer, the steps are executed in a defined order upon the occurrence of the specified transition conditions. However, the SDS function is more like a state machine in that a transition from one step can occur to one of several specified steps depending upon which one of several defined transition conditions is satisfied. A transition condition can be a change in status of a single input device represented by a bit in the input image table 55 or the status of a timer, counter or similar mechanism represented by bits of the status file 56. As will be described, this status change may be defined as either a high to low or a low to high logic level transition of the associated bit. Alternatively, a number of data bits can be examined according to a Boolean logic expression, the truth of which indicates when a given step transition should occur.

Figure 4:
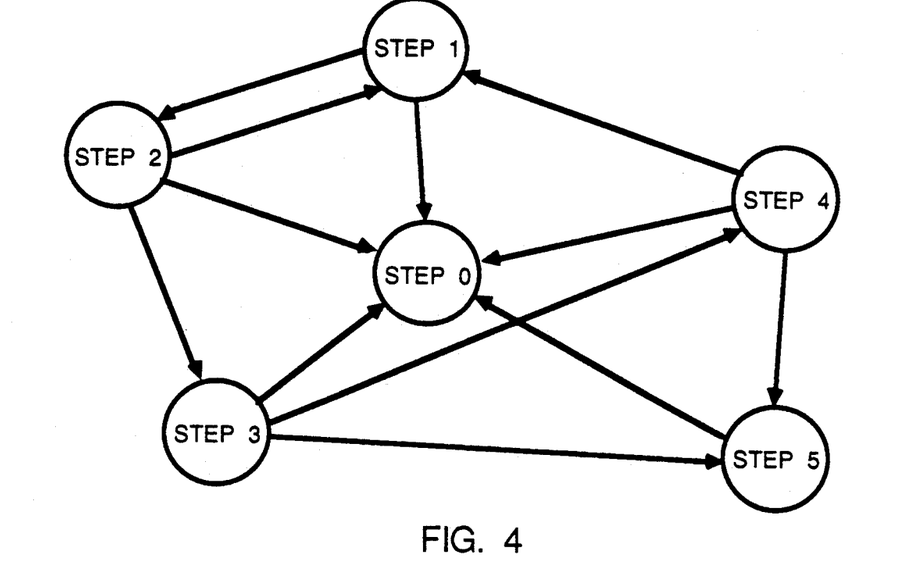
FIG. 4 is a state diagram of an exemplary control sequence to be performed by the present invention.

FIG. 4 illustrates the steps in an exemplary control process and is essentially a state diagram in which each step is a unique state of the process or machine being controlled. Each step of the process represents a change in the states of the output devices coupled to the programmable controller. Step 0 is initially executed upon starting the sequencer program. Thereafter, a transition back to step 0 usually occurs only in an error condition, as will be described, or upon a resetting of the system. The arrows in the figure indicate the later transitions which may occur between the steps. Transitions can be defined from one step to only one other step, or to any one of several steps depending upon the state of different inputs to the programmable controller. For example, a normal transition can occur from step 2 to either step 1 or step 3, depending upon the status of selected inputs to the programmable controller. It is apparent from the "state diagram" of FIG. 4 that the steps are not executed in numerical order nor in any other single defined order.

Figure 5:
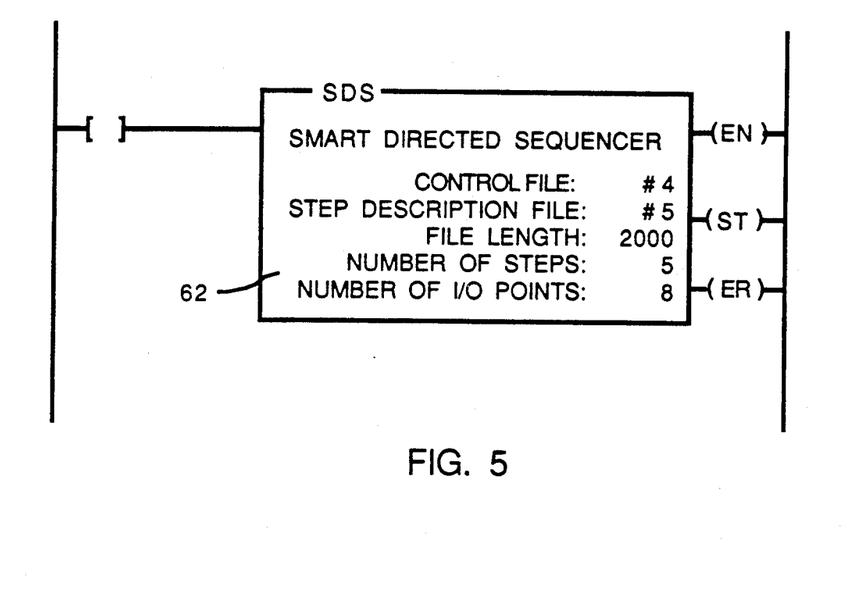
FIG. 5 is a representation of a rung of a ladder diagram control program, which incorporates the present smart directed sequencer, as the rung is displayed on a programming terminal.

The SDS function is embodied as an operation of a ladder logic control program, as shown diagrammatically in FIG. 5. However, data specified by the user of the SDS function is considerably more elaborate than the typical ladder logic operation. As defined on the ladder diagram, the SDS operation box 62 specifies the number of a control file 64 in the system data table 50 (FIG. 3) of shared system RAM 36 which contains global information relative to the control sequence. The system data table 50 also contains a Step Description File 66 which contains data defining each sequence step and the conditions for a transition between steps to occur. The number of the step description data table file (e.g. #5) is listed on the ladder rung. The SDS operation box 62 also specifies the length of the Step Description File and the number of steps in the control sequence. The number of inputs and outputs from the I/O image tables which are used in the sequence is defined entered by the user in the SDS operation box 62. A large programmable controller system can have several hundred I/O points and the sequencer operates on a subset of these points. In order to increase operating speed, the allocation of I/O points is limited to entries of 8, 16 or 32 inputs and an equal number of outputs. As will be seen, since each step transition in the sequence is determined by a change in the state of an input bit, the selection of the limit on I/O points also limits the total number of possible transitions from any one sequence step.

Figure 6:
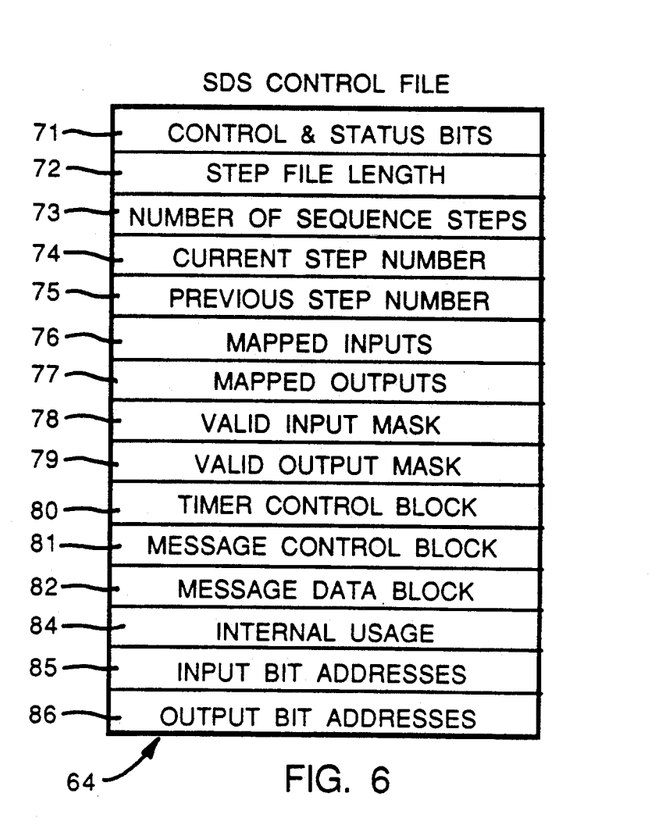
FIG. 6 depicts the data structure of the control file for the sequencer function.

The SDS control file 64 has a structure depicted in FIG. 6. The first data block 71 of the SDS control file contains a word formed by control and status bits which among other things indicate whether various processing options are enabled or disabled, as will be described subsequently. The length of the associated Step Description File 66 and the number of sequence steps are stored in the next two data blocks 72, and 73 respectively. These data enable the software which performs the SDS function to locate other data within the control file. The fourth data block 74 of the control file 64 is used to store the numerical designation of the current step of the control sequence and the fifth data block 75 stores the designation of the previous step. The previous step information is employed to provide a history of the control process in the event of an error condition, as will be elaborated upon.

The next two file data blocks 76 and 77 contain the status of the specific ones of the programmable controller inputs and outputs which have been selected to be operated upon by the SDS control sequence. Each block is thirty-two bits wide and together represent an I/O image sub-table for the SDS function with each bit corresponding to the state of a selected input or output represented in files 54 and 55, or the status of a mechanism from file 56 (FIG. 3). Although up to thirty-two input bits can be used to define sequence step transitions, to simplify the explanation, the present invention will be described in the context of a system in which only eight input bits are used as denoted in the SDS ladder diagram box 62. As will be described, the data bits representing the status of the I/O devices selected for the SDS function are copied (or mapped) between the SDS control file 64 and the files 54–56 in system data table 50. The mapped input block 76 is updated at the start of the execution of the SDS function in the ladder logic control program. The addresses of each selected input and status bits in the data table files 55 and 56 are sequentially stored in data block 85 at the end of the SDS Control File 64. After the evaluation of whether a sequence step transition should occur, the mapped output bits in file block 77 are copied into the corresponding locations in the main output image table 54. For this purpose the corresponding addresses for output image table 54 are stored in data block 86 of the SDS Control File 64.

As stated previously up to thirty-two input bits and thirty-two output bits can be used by the SDS control function. The user, during configuration of the SDS function, specifies one of three sizes (eight, sixteen or thirty-two) for the number of I/O points in the SDS operation block. However, less than that number of I/O points may be used. For example, an SDS function may only require five input bits and may only control seven output bits. In this case, the user would select eight as the number of I/O points in SDS operation block 62. As each I/O point is employed to specify a step transition, a bit in a valid input mask 78 or a valid output mask 79 is set to indicate which bit in the group of I/O points is actually being used. These masks are used in subsequent processing to remove irrelevant bits in the mapped inputs and outputs from consideration.

Each step of the control sequence has a time limit so that if the SDS function remains in the same step for more than the specified interval, a sequence step transition will occur regardless of the state of the inputs. The timer control data block 80 contains the preset and accumulated timer values and a timer enable flag for the currently active step. The use of this timer data will be described subsequently.

One of the other features of the SDS function is the capability of generating error messages for transmission via the processor module's communication processor 21 (FIG. 2). A message control data block 81 in the control file 64 contains address and other data to enable the error message to be set to a receiving device, such as the terminal 11. The actual message is stored in control file block 82. Finally, a group of words in data block 84 is assigned for internal usage as temporary storage locations and as a message buffer when several messages are to be sent.

Figure 7A:
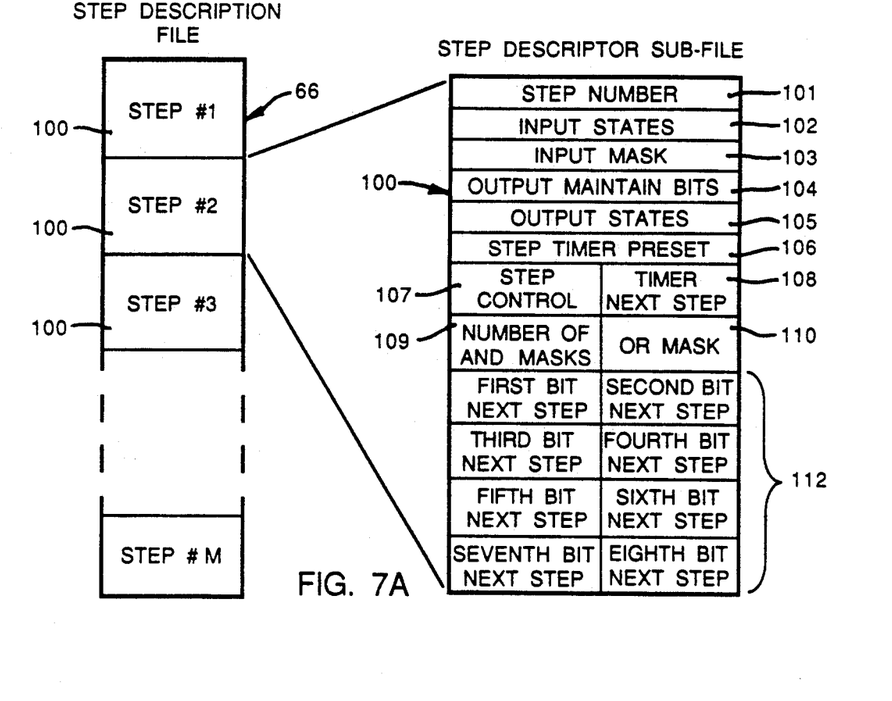
FIGS. 7A, 7B and 7C depict the data structure of the step description file for three different configurations of the sequencer function.

As discussed above, the other data file maintained for the SDS function is the Step Description File 66, which has structure depicted in FIG. 7A. The Step Description File 66 comprises separate sub-files 100 for each step in the sequence. A step descriptor sub-file 100 consists of a series data blocks containing descriptive information that defines the machine control for that step. The sub-file for the second step has been expanded in the figure to illustrate each of its data blocks. The first word 101 in the step sub-file contains the step number and serves as a checking mechanism to insure the proper step in the file has been accessed. The second sub-file entry 102 contains data bits which indicate desired states for the inputs which are used in determining whether to enter or exit the step, as will be described.

A process sequence step transition can occur when a specified input bit makes a high to low or a low to high logic state transition. Not all of the input bits designated in control file block 76 are used in determining whether a transition from this particular step should occur. For example, since only two normal transitions can occur from step 2 in the process of FIG. 4, as few as two input bits can be used to indicate whether a transition should occur from that step. An input data mask is stored in the next sub-file entry 103 and is used to filter out input bits in file 76 which are not to be used in determining if a transition should be made to another step. Step sub-file entry 104 identifies certain ones of the mapped output bits which are not to be changed when this step is active. That is, the mapped output bits designated in this entry remain in whatever state they were in upon transitioning to that step. In addition, the states that the mapped outputs are to assume in this control step are stored in sub-file entry 105.

A preset value for the loading the step timer when the step begins is retained in a two word sub-file entry 106. A byte 107 of the next step sub-file entry contains control and status bits for this step and the other byte 108 identifies the next step to be executed if the step timer times out.

The present sequencer allows a step transition to be specified by a logic level transition of either a single input bit of a series of input bits. A transition specified by a series of bits is determined by logically ANDing those bits so that a transition occurs only when all the selected bits are in the proper state. A separate Boolean logic AND expression can be specified for each transition from a given step and the number of the expressions is stores in byte 109 of the step sub-file. Byte 110 contains a mask of the eight input bits which identify those bits that are used individually, i.e. not in a Boolean logic expression, to specify a step transition. Since the defined transition of any one of these bits causes a step change, the mask is referred to herein as an "OR mask". Each mapped input bit can be used in the determination of only one step transition.

The remaining section 112 of the step sub-file contains eight bytes which define the Boolean logic AND expressions and the next steps to which transitions are to occur. The exact configuration of section 112 depends upon the number of single bit transitions and Boolean logic expressions defined for the present step. In one situation, each of the eight input bits specify a unique transition to another step and Boolean logic expressions are not defined. For this configuration as shown in FIG. 7A, section 112 contains a look-up table for determining the desired next step based on an individual input bit transition. In the example using eight input bits, there are eight entries in the look-up table with each one byte entry indicating the number of the next step to execute upon a change in state of the bit from the respective input device. It should be noted that not every input device has to be used to signal a step transition in which case its corresponding next step entry in the look up table will be zero.

Figure 7B:
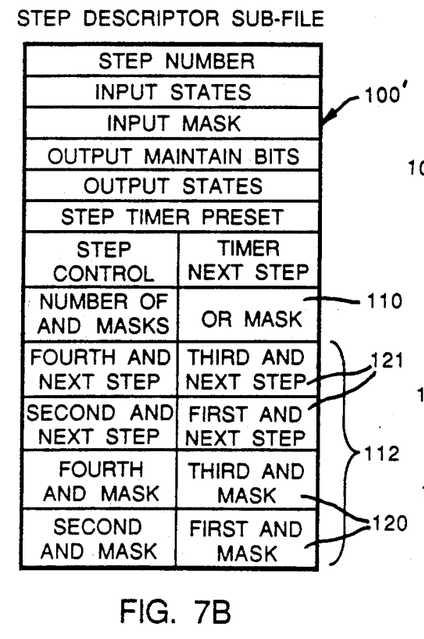

In another configuration, depicted by the step descriptor sub-file 100' of FIG. 7B, all of the transitions from the present step are defined by Boolean logic AND expressions. Each of the eight input bits can be used in only one Boolean logic expression, thereby limiting the maximum number of expressions to four. However it is possible to use all eight input bits in a single Boolean logic expression to define only one normal step transition. In the maximum case the OR mask in byte 110 is unused and byte 109 indicates four AND expressions. Each expression is defined by an eight bit AND mask 120 stored in section 112. The bits of the AND mask 120 relate to the mapped input bits in file 76 and a one bit in the mask indicates that the corresponding input bit is to be used in that AND expression. For each Boolean logic expression, there is a designation in bytes 121 of the next step to go to when the expression is true.

The present invention allows the operator flexibility in specifying some of the transitions to another step as occurring upon the transition of a single input bit and other step changes based on Boolean expressions. One example of such a combination is depicted by the step descriptor sub-file 100" in FIG. 7C in which four step transitions are defined by single bit transitions and two other step transitions are specified by Boolean logic AND expressions. In this latter example, the OR mask in byte 110 has four bits set to indicate the individual input bits used for step transitions. When input bit designated by the least significant one of the set mask bits makes the defined state transition, the sequence advances to the next step for the first bit as identified in byte 125. When the input bit for the next more significant mask bit which is set makes the defined state transition, the sequence advances to step defined by byte 126 in section 112 that is labeled "Second Bit Next Step", and so on. The two AND expressions are specified by the last four bytes of the step subfile 100" in the same manner as the expressions in FIG. 7B.

SEQUENCER OPERATION

The user employs the programming terminal 11 and its program editing software to construct the ladder diagram in much the same manner as in previous programmable controllers. The SDS function is selected by entering the appropriate instruction into the terminal 11 and a rung similar to that shown in FIG. 5 is displayed on the terminal's CRT display. After the user has filled in the information in the SDS block using the cursor and other keys on the terminal, the control program editing software in the terminal guides the user through other display screens for the entry of the control file and step description file data.

Figure 7C:
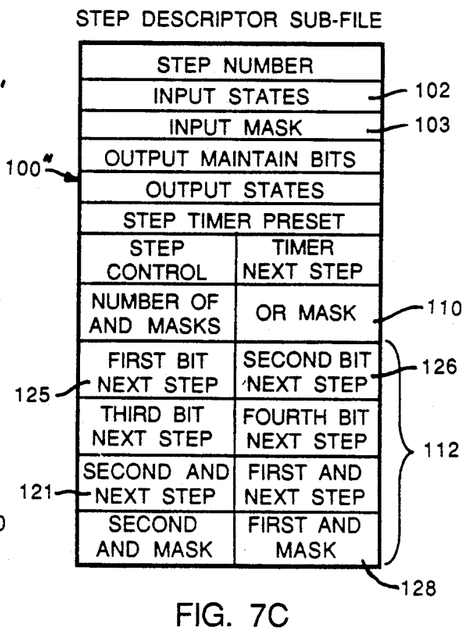

Specifically, for each step of the sequence the user enters data regarding the normal transitions which can occur to other sequence steps and the condition that is to cause each transition. With reference to FIG. 4, a normal transition can occur from step 2 to either step 1 or step 3. A transition to step 0 only happens when an error occurs. For example, during programming the user specifies that a transition from step 2 to step 1 will occur upon a high to low change in the state of the input device having the logical address "21". The program editing software converts this entry format into the data structures for the SDS function that have been described previously. Specifically, one of the mapped input bits (e.g. the third bit) in the SDS control file 64 is assigned by the editing software to the input device at address "21". In doing so, the logical address "21" of the designated input device is stored in the third location of the input bit address table 85 in the SDS control file. The third bit of the input mask 103 step descriptor sub-file 100" for step 2 is set to indicate that the corresponding mapped input bit is relevant to making a sequence step transition determination. At the same time, a zero logic level is stored in the third bit position of the Input States entry 102 to indicate that a high to low input change is to be used. In addition, the number of the sequence step to which the transition should be made (e.g. sequence step 1) is stored in the third bit next step block in section 112 of the subfile for step 2. Another set of data entries in the step description sub-file 100" is made to define the transition from step 2 to step 3. During the creation of the data structures, the output states for step 2 are stored in its step description sub-file, and the corresponding logical addresses for the output devices are stored in the output bit address table 86 in the SDS control file 64.

The user also can specify that a step transition should occur when several input bits have the proper state. To do so, a function key on the terminal 11 is pressed to place the program editing software in a mode that allows a Boolean logic AND expression to be crated. The user then is able to select the mapped input bits for the expression and the state of the bit (high or low) in order for the expression to be true. As each mapped input bit is selected the corresponding bit in an AND mask is set and a corresponding bit in the Input States entry 102 is made high or low to indicate the state of the input bit for a true expression. When the expression is complete, the AND mask is stored in the respective byte 128 in section 112 of the step descriptor sub-file 100″. The next step to go to upon the expression being found true is defined by the user and stored in the corresponding byte 121 in the step subfile.

Figure 8:
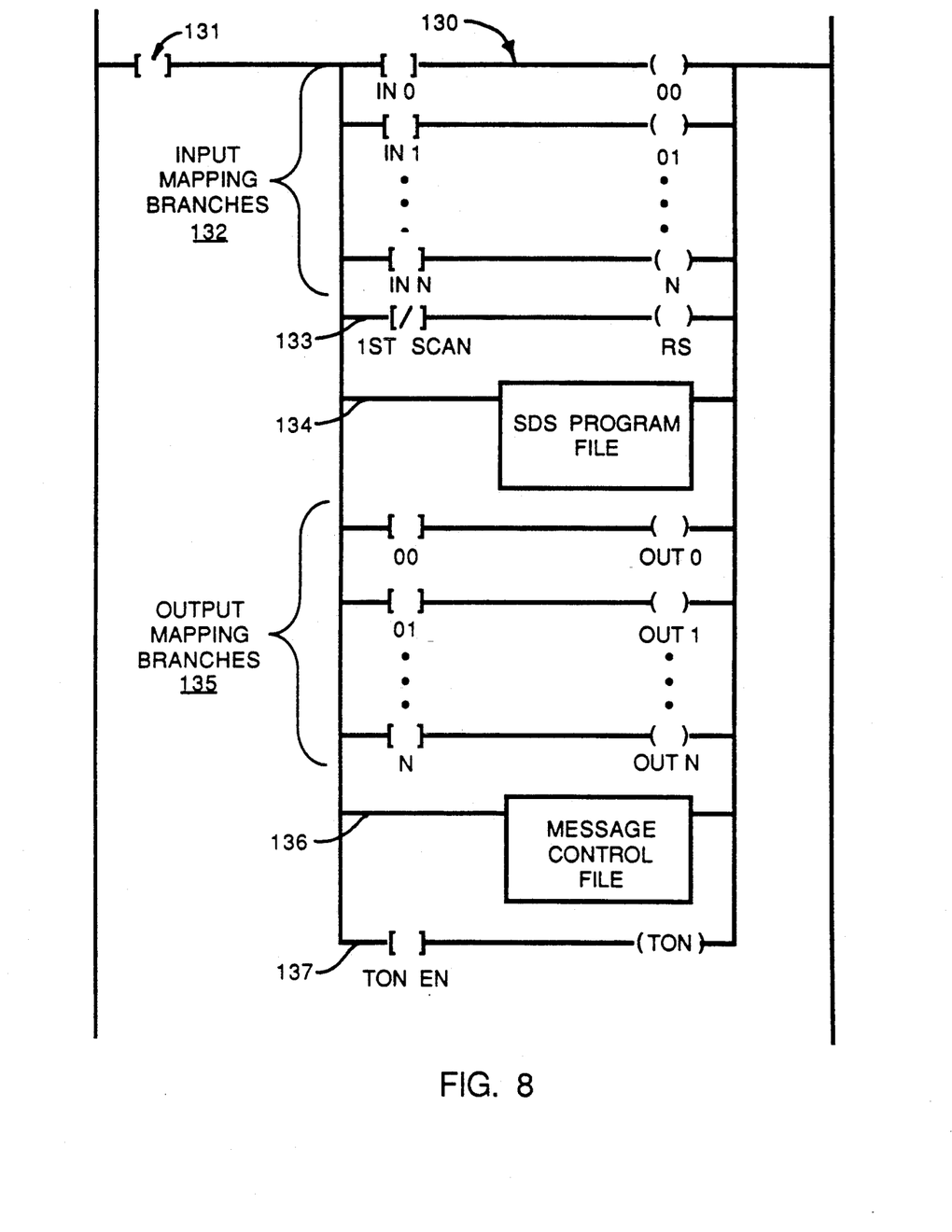
FIG. 8 illustrates the actual ladder logic control program branches for the sequencer function.

The program editing software also uses the SDS configuration information to create a ladder program rung 130 as shown in FIG. 8. The actual SDS function ladder rung 130 consists of a set of parallel branches 132-137. Nevertheless, the terminal 11 displays the rung as shown in FIG. 5, i.e. the SDS function is represented by a single block on the CRT display 8 and not as a series of parallel rung branches.

Unlike conventional ladder diagram program rungs, the SDS function is always executed regardless of the rung being true or false. However, the truth of the rung determines how the SDS function operates, with a transition to sequence step 0 occurring when the rung is false. The truth of the rung is determined by an input operator 131, which can be a standard bit examination instruction for example, and is stored in a register in second microprocessor 41.

An initial group 132 of the parallel SDS rung branches contains conventional "examine if closed" (XIC) input instructions and output instructions to the bit locations in the mapped input block 76 of the SDS control file 64 (FIG. 6). A separate one of these branches 132 is created by the terminal's control program editing software for each mapped input bit. In creating this group of branches 132, the software sequentially uses each input bit address in block 85 of the SDS control file 64 to form an XIC instruction for that bit address in the main input image table 55 of the system data table 50. An output instruction is also formed on the branch to store the input state bit in its assigned position in the mapped input data block 76 of the SDS control file. The input mapping branches 132 update the mapped input block 76 with the current status of the associated input devices. Specifically, the corresponding mapped input bits are set to a high logic level when the associated branch is true and reset to a low logic level when the branch is false.

Following the group of input mapping branches 132 on FIG. 8, is a branch 133 which examines a flag bit in the programmable controller status file 56 that indicates whether this is the first scan through the ladder logic program following a system restart. If the rung is true and this is the first scan through the program, branch 133 sets the rung status bit (RS) in the SDS control/status block 71.

The next SDS rung branch 134 calls the SDS machine language routine in the programmable controller's firmware stored in the second RAM 45 causing the second microprocessor 41 to execute the sequencer function. The SDS routine is graphically depicted in the flow chart of FIGS. 9A and 9B. Each time that the SDS function is invoked, certain conditions are checked before entering the normal mode of operation. The first condition is the rung status which is checked at program step 200. If the rung is false as indicated by the contents of a register in the second microprocessor 41, the program execution transfers to step 201 where the sequencer is placed in step 0. This transition to step 0 is accomplished by copying the contents of the current step number data block 74 of the SDS control file 64 into the previous step number data block 75. Then, the current step number data block is zeroed. Next, the mapped output devices are turned off by loading the mapped output data block with all zero bits at program step 202. The rung status register in second microprocessor 41 is then set true at program step 203. Thereafter, SDS macro-instruction routine returns to the ladder interpreter program.

Referring again to FIG. 8, the termination of the SDS machine language routine advances the ladder program from branch 134 to a group of parallel branches 135 which transfer the mapped output state bits in SDS control file data block 77 to the corresponding addresses in the main output image table 54 (see FIG. 3). These ladder branches 135 were formed by the program editing software within the programming terminal 11 upon the creation of the ladder logic control program and the SDS function data files. The formation of these branches is similar to the formation of the input mapping branches 132. However, each of the output mapping branches 135 consists of an input instruction which causes the second microprocessor 41 to obtain the value of one of the mapped output bits within SDS control file data block 77. Then the branch utilizes a conventional output enable (OTE) instruction which causes second microprocessor 41 to transfer that status bit to the corresponding output image table location pointed to by an address in data block 86 of the SDS control file 64. At this point in time, the output mapping branches 135 transfer the zero logic level mapped output bits from SDS control file block 77 to the output image table 54, which ultimately turns off the associated operating devices.

Then SDS function ladder branch 136 instructs second microprocessor 41 to examine the message enable flag within the control/status data block 71. At this initial phase there is not a message to be sent. However, if the message enable flag is found to be set, as occurs in latter phases when a message is awaiting transmission, the second microprocessor 41 notifies the first microprocessor 22 to obtain the message control block 81 and the message data block 82 from the SDS control file 64 and transmit the message to the designated receiving device.

The ladder logic program interpretation then advances to SDS branch 137 where a timer enable flag within control/status block 71 of the SDS control file 64 is examined to determine if the timer is functioning. If the timer flag is set, the second microprocessor 41 enables the timer operation utilizing a conventional timer on (TON) ladder logic program instruction. With the timer enabled, the microprocessor operation is periodically interrupted at a fixed interval of time and the contents of the timer control block 80 are decremented. After the timer is enabled, the SDS ladder rung terminates advancing the execution to the next rung in the ladder.

Figure 9A:
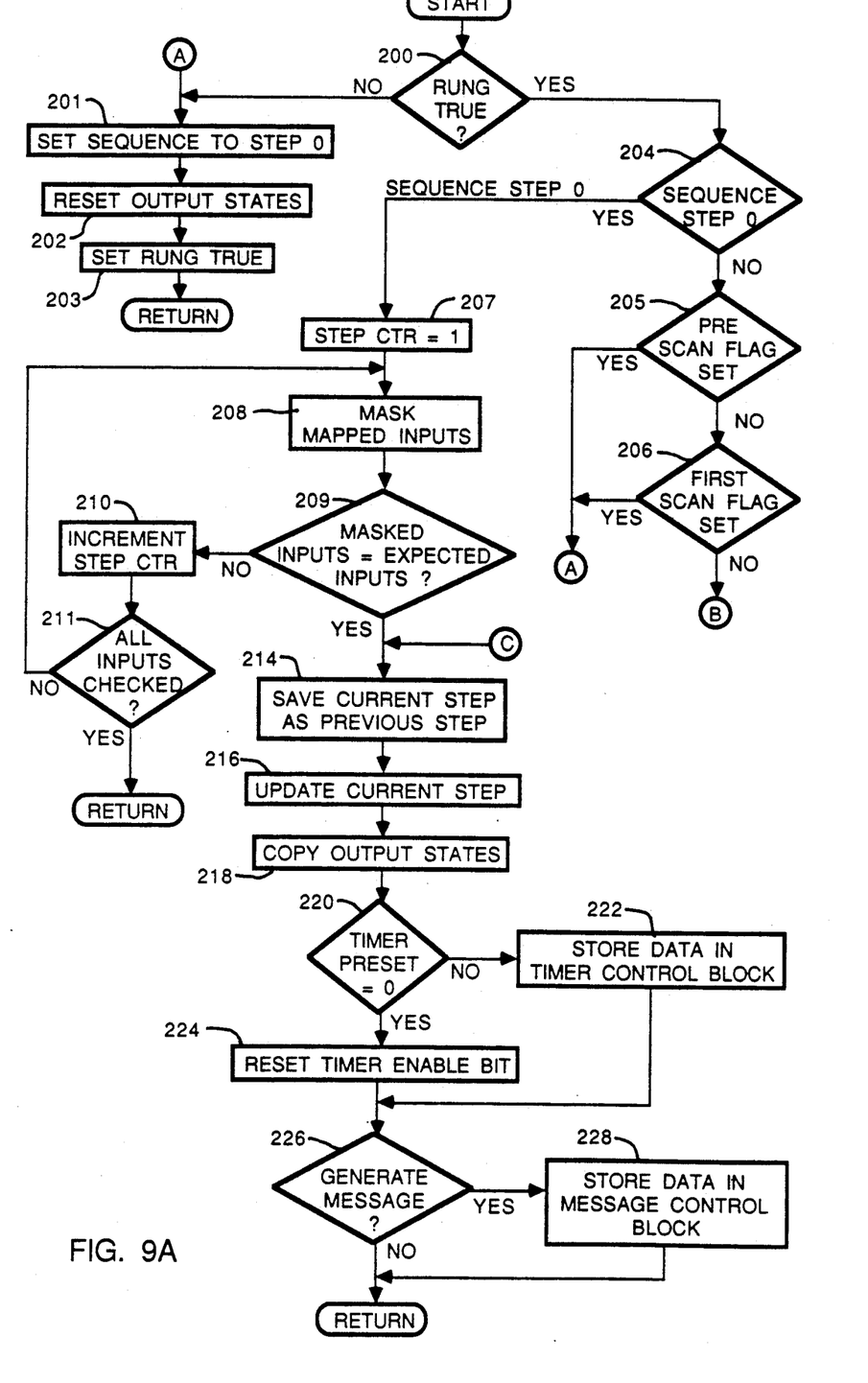
FIGS. 9A and 9B represent a flow chart of the machine language control program for the sequencer function.

Referring again to the flow chart of FIG. 9A, if the rung 30 is true upon entering the SDS machine language routine, the execution will advance to program step 204 where data block 74 is inspected to determine if the sequencer is in step 0. If so, a branch to program step 207 takes place. Sequence step 0 initializes the sequencer at which point a determination is made as to which step in the sequence coincides with the current status of the controlled machine. The initial function for sequence step 0 is to set the contents of a memory location which serves as a step counter to one at program step 207. The step counter is used to access each of the step descriptor sub-files 100 depicted in FIG. 7A.

Then at program step 208 select mapped input bits in control file block 76 are checked to determine whether they match an expected logic level for the step designated by the counter. To do so, high level bits in the OR mask 110 for the designated step is used to choose the mapped input bits which then are compared to the state of a corresponding bit in the input state sub-file entry 102. These bits of the input state entry 102 specify whether the chosen mapped input bit is expected to be at a high or low logic level when the process enters the associated sequence step. The result of this processing determines whether or not the machine operation is in the designated step.

If the chosen inputs are not in the expected states indicating that the machine is at a different step, the SDS program execution branches to step 210 where the step counter is incremented and then checked at program step 211 to determine if sequence steps remain to be checked. If there are steps remaining, the program execution returns to step 208 where the mapped inputs are compared with the expected inputs for the next numerical sequence step. If an input bit match has not been found after all of the sequence steps have been examined, the SDS machine language routine ends and returns to the ladder logic program interpreter. In order for the program to commence at a given step, a designated set of inputs must have the correct state.

Referring still to FIG. 9A, once a match has been found between the expected inputs for a given sequence step and the actual inputs at program step 209, the sequencer is placed into that sequence step. This is accomplished at program step 214 by the second microprocessor 41 copying the current step number from block 74 of the SDS control file 64 into the previous step number block 75. Then the contents of the step counter memory location, which indicates the number of the sequence step at which an input bit pattern match was found, are transferred into the current step number data block 74 of the SDS control file 64 at step 216. Upon advancing to step 218, the output states stored in entry 105 of the step descriptor sub-file 100 for the given step are copied into the mapped output block 77 of the SDS control file 64. In doing so any mapped output bits designated by the Output Maintain Bits 104 are not changed from their previous state regardless of the state of the corresponding bit of the output states 105.

Thereafter, the step descriptor sub-file 100 for the next sequence step is checked at program step 220 to determine if the step timer preset block 106 has a non-zero value. A non-zero value indicates that the step timer is to be enabled upon entering the sequence step. If a non-zero value is found, the second microprocessor 41 at program step 222 copies the step timer preset value into the timer control data block 80 in the SDS control file 64, and sets a timer enable flag in the control/status data block 71. Alternatively, if the timer preset value in the step descriptor sub-file 100 is zero, the timer enable flag is reset at step 224 before the program advances.

Then the step descriptor sub-file 100 is checked again to determine if a message should be generated as indicated by a message bit within the control bits 107. For example, upon entering certain sequence steps, a message is sent to the programming terminal 11 to notify the user. If a determination is made at program step 226 that a message is to be generated, the data regarding that message is accumulated by the second microprocessor 41 and stored in the message control block 81 of the SDS control file 64 at program step 228. At that time, a message enable flag is set in control/status block 71. The message flag is automatically reset by the firmware task which transmits the message. Once the message has been formulated and stored, the SDS machine language routine terminates by returning to the ladder logic program interpreter routine.

At this time the new mapped output states are transferred to the output image table 54 by rung branches 135 in FIG. 8. Any messages to be sent are processed by branch 136 and the timer is handled at branch 137. The interpretation of the ladder logic program then advances to other rungs that follow the SDS rung 130. The SDS rung will be interpreted again during the next scan of the ladder logic program.

Referring again to FIG. 9A, if the sequence is not in step 0 when the SDS machine language routine is entered and the SDS rung is true, the execution of the routine will advance to program step 205. When the programmable controller 10 is placed in the program run mode, the ladder control program is prescanned so that the I/O image tables are placed in their proper states to control the equipment connected to the programmable controller. The prescan is indicated by a flag stored in system status file 56 of the system data table 50 (FIG. 3). This flag is checked and if the system is in the prescan mode, the SDS macro-instruction routine branches to step 201 where the SDS function is placed in sequence step 0 as previously described. A similar initialization, although not as extensive, occurs during the first scan through a ladder program called by a new sequential function chart descriptor file. This first scan is indicated by another flag in the system status file 56. If the system is in the first scan mode, the SDS machine language routine also branches from program step 206 to step 201 to initialize the control sequence.

Figure 9B:
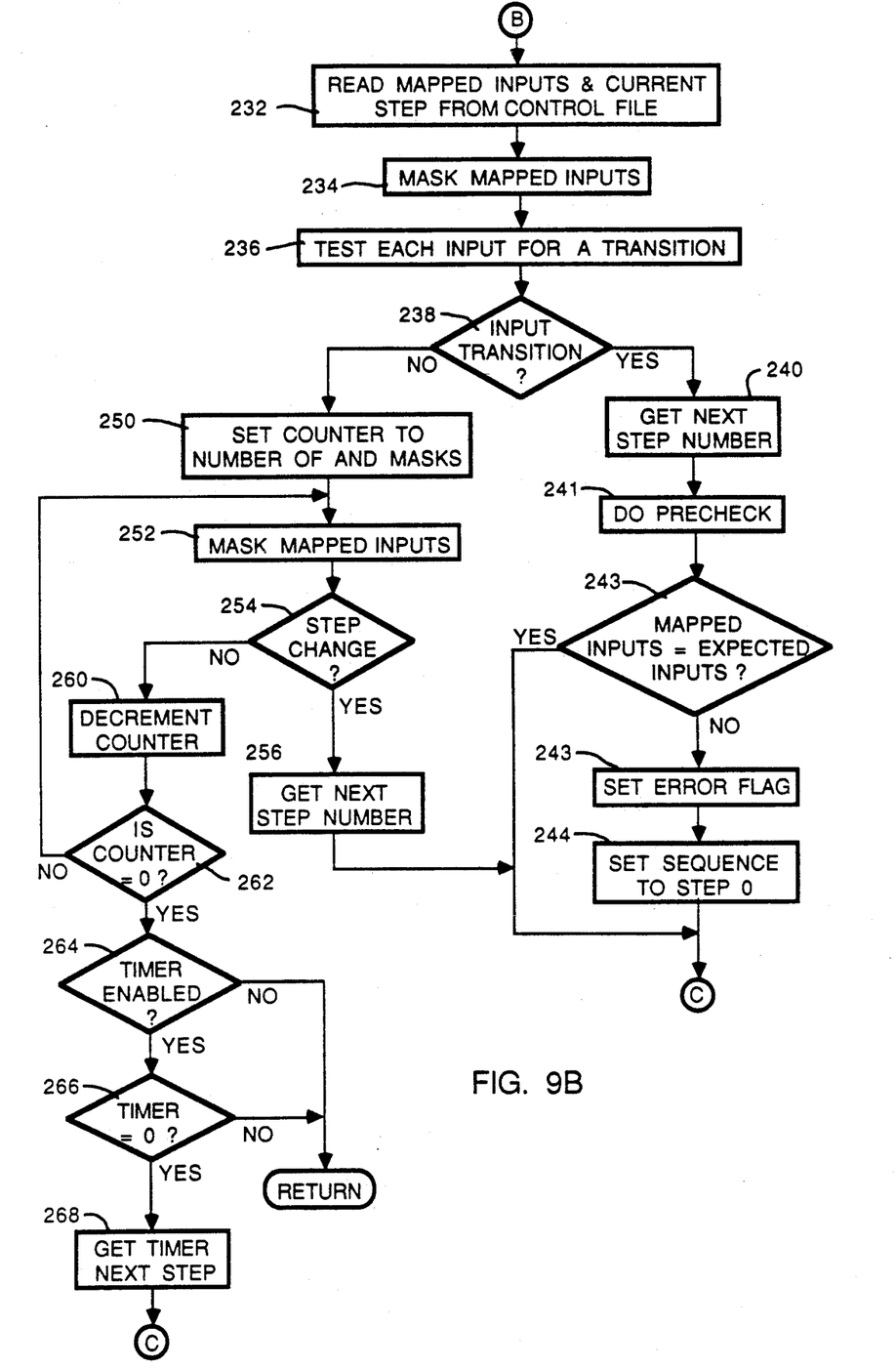

On subsequent scans of the ladder logic control program, the SDS rung 130 will be found to be true and the program execution will pass through steps 200 and 204–206 to step 232 on FIG. 9B. In this section of the program the second microprocessor 41 determines whether a transition to another step in the sequence should occur. To do so, the second microprocessor obtains the number of the current sequence step from the SDS control file 64 and uses the number to access the corresponding step descriptor sub-file 100. At step 234, the second microprocessor obtains the input mask 103 from that sub-file and logically AND's the input mask, the mapped inputs from file data block 76 and the valid input mask in file block 78. This action filters out those of the mapped input bits that are irrelevant to detecting whether a transition from the current step should occur. The result of the masking operation is a pattern of bits in which the irrelevant bits are zeroed. This bit pattern is temporarily stored and then logically AND'ed with the OR mask in byte 110 of the step description sub-file.

The second microprocessor 41 at step 236 then compares each of the bits resulting from the masking process with the corresponding bit in the Input States entry 102 in step descriptor sub-file for the currently active process step. If any pair of compared bits is not identical, a designated state change of an input has occurred which signals a step transition should take place.

Upon a designated change of a input bit being found, the program execution branches from step 238 to step 240 where the transitioning bit's location within the mapped input data block 76 is used to index into section 112 of the step descriptor subfile 100 to the number of the next step in the control sequence. The number of the next step is stored temporarily. Then, at program step 241, a pre-check is made to determine if the state of the mapped inputs coincide with the necessary states in order to enter the designated next step of the sequence. This pre-check can be used as a form of error checking to determine when an invalid transition might occur. The OR mask in entry 110 of the next step's descriptor sub-file is used to select bits from the Input States entry 102 with are not used in Boolean logic expressions in the next step. The second microprocessor 41 then compares the selected bits to corresponding mapped input bits from file block 76 at program step 242. If the states of the corresponding mapped input bits coincide with the expected states defined by bits in the Input States entry 102, the program execution jumps to step 214 where an orderly transition to the next sequence step is performed.

However, if the two bit patterns do not coincide at program step 242, an error flag is set at program step 243 and the temporary storage location which is designated to hold the number of the next step is set to step 0 at program step 244. In this situation, step 0 is a default step to which the sequence returns in the event of an error condition.

Then the program execution jumps to step 214 to make a transition to step 0 and generate an error message. In generating the message the message data block 82 in the SDS control file is loads with the number of the step from which an erroneous transition occurred, a designation of the input bit which resulted in the error and the input bit's state when the error occurred. This error message data is used by the message handling task to inform the system user of the error and the conditions which lead to the error. The message provides information which the user can employ to diagnose the problem causing the malfunction.

If none of the input bits examined individually at program step 236 has undergone the defined state change, the Boolean logic expressions are evaluated to determine whether one of them indicates that a step transition should occur. To do so, the program execution branches from program step 238 to step 250 where the second microprocessor 41 presets a counter to the number of Boolean logic expressions using the number of AND masks stored in byte 109 of the descriptor sub-file 100 for the currently active step.

The first AND mask is read from section 112 of the step descriptor subfile at program step 252. The AND mask designates the mapped input bits in file block 76 which are to used in the Boolean logic expression. The designated mapped input bits are obtained and compared at step 254 to the corresponding bit of the Input States entry 102 in the current step descriptor sub-file 100 to determine if the designated bit is in the proper state for the expression to be true. If all the designated input bits are in the proper state, the Boolean logic expression is true signalling that a step transition should occur. In this event, the SDS program execution advances to step 256 at which the second microprocessor 41 reads the number of the next step from the byte 121 associated with the selected AND mask. The execution then jumps to step 214 to change to the designated next step.

If the Boolean logic expression is determined to be false at step 254, the program execution branches to step 260 where the second microprocessor 41 decrements the mask counter. The mask counter then is checked at step 262 to determine if it has reached zero, which occurs when all of the Boolean logic expressions for the currently active step have been tested. If the mask counter has a non-zero value, the program execution returns to step 252 to examine another expression.

When the truth of all the Boolean logic expressions have been evaluated, the second microprocessor 41 examines the step timer enable flag within the control/status block 71 of the SDS control file 64 at step 264. If the step timer is not enabled, the SDS machine language routine terminates returning to the standard ladder logic program interpreter routine. When the step timer is enabled, the program execution advances to step 266 where the accumulated value of the timer in the SDS control file block 80 is tested to determine if it has timed out. The SDS machine language routine returns to the ladder logic program interpreter routine when the timer has not expired. On the other hand, when the timer has expired, the second microprocessor 41 at program step 268 obtains the data from the timer next step entry 108 within the step description file which indicates the next step to which the sequence should advance. The program then jumps to program step 214 where the indication of the next step is utilized by program steps 214-230 to advance the SDS function to the next sequence step.

The present invention permits the process or machine being controlled to be defined by a plurality of states each being considered as a functional step. The states may be very specific so that the transition of a single input parameter triggers an advance to another step, or the process can be defined in high level terms in which the status of several input parameters determine a step transition. The group of parameter associated with a single step transition are specified by a Boolean logic expression. Transitions can be defined to one of more states from any given state depending upon the validity of separate Boolean logic expressions or single parameter transitions. The input parameters can be directly sensed conditions of the controlled process or machine or the parameter can be the status of a counter, timer or other mechanism of the programmable controller which reflects a process or machine condition.

The invention being claimed is:

1. In a programmable controller having a processor which repeatedly executes instructions of a stored control program to examine the states of input devices connected thereto, and to operate output devices connected thereto in accordance with the states of the input devices, the programmable controller having conductors coupled to the processor for carrying data and control signals, the improvement therein comprising:
a first means, coupled to the conductors, for storing data regarding each step in a machine control process with the data for each step including: states for the output devices, a designation of a plurality of other steps in the process to which transitions may occur, data defining a Boolean logic expression specifying the states of a plurality of inputs devices which must exist in order for a transition to occur to a first one of the designated other steps, and a designation of a change in the state of a single input device which must take place in order for a transition to occur to a second one of the designated other steps;

a second means, coupled to the conductors, for storing an indication of the step of the process which is currently active;

means for setting the states of the output devices to the states stored for the currently active machine control process step, said means for setting being coupled to the conductors;

a first means for detecting the truth of a Boolean logic expression defined by data received from said first means for storing;

a second means for detecting the occurrence of the change in the state of the single input device designated in said first means for storing; and means for loading data into said second means for storing in response to said first and second means for detecting, wherein an indication of the first one of the designated other steps is loaded into said second means for storing when the Boolean logic expression is found to be true, and an indication of the second one of the designated other steps is loaded into said second means for storing when the change in the state of the single input device occurs.

2. The programmable controller as recited in claim 1 further comprising:

means for timing the interval of time which elapses after a change in the indication stored in said second means for storing; and wherein said means for loading responds, when said means for timing indicates that a predetermined amount of time has elapsed, by loading an indication of a predefined step into said second means for storing.

3. The programmable controller as recited in claim 2 wherein said first means for storing further includes a location associated with each step to store a value specifying the predetermined amount of time.

4. The programmable controller as recited in claim 2 wherein:

the data for each step that is stored in said first means for storing further comprises expected states of input devices; and said means for loading only loads the indication of a specified other step when the expected states of input devices for the specified other step coincide with the actual states of those input devices.

5. The programmable controller as recited in claim 4 further comprising a means for generating an error indication when the expected states of input devices for the specified other step do not coincide with the actual states of those input devices.

6. The programmable controller as recited in claim 4, wherein said means for loading loads an indication of a default step into said second means for storing when the expected states of the input devices for the specified other step do not coincide with the actual states of those input devices.

7. In a programmable controller having a processor which executes instructions of a stored control program to examine the states of input devices connected thereto, and to operate output devices connected thereto in accordance with the states of the input devices, the programmable controller having conductors coupled to the processor for carrying data and control signals, the improvement therein comprising:

a memory coupled to the conductors to store data regarding each step in a machine control process, and for each step said memory having a group of storage locations which include a first storage location containing states for the output devices, a second storage location containing a designation of a given step in the process, a third storage location containing an indication of states of a first plurality of input devices, a fourth storage location containing a data mask for selecting a set of data bits representing states of a second plurality of input devices, a fifth storage location containing designations of changes in the states of the second plurality of input devices, and a plurality of other storage locations each one being associated with a data bit in the set of data bits and containing a designation of another step in the process;

a means, coupled to the conductors, for storing an indication of the step of the process which currently is active;

means, coupled to the conductors, for setting the status of the output devices to the states stored for the currently active machine control process step;

a first means for detecting when all of the first plurality of input devices have the states indicated in the third storage location;

means for combining the data mask contained in the fourth storage location with data bits representing the states of the input devices to produce the set of data bits representing the states of the second plurality of input devices;

a second means for detecting when a bit in the set of data bits makes one of the changes designated in the fifth storage location; and means for loading data into said means for storing in response to said first and second means for detecting, wherein the designation of the given step is loaded into said means for storing when all of the first plurality of input devices have the states indicated in the third storage location, and designation of another step in the process is loaded from one of the given plurality of other storage locations into said means for storing when a change in the state of a bit in the set of data bits occurs.

* * * * *